United States Patent
Sasin et al.

[11] Patent Number: 6,134,302
[45] Date of Patent: Oct. 17, 2000

[54] VOICE PATH TESTING IN TELECOMMUNICATIONS SYSTEM

[75] Inventors: Tiberius Sasin; Steffen Hermanns, both of Aachen, Germany

[73] Assignee: Telefonaktiebolaget LM Ericsson, Stockholm, Sweden

[21] Appl. No.: 08/987,476

[22] Filed: Dec. 9, 1997

[30] Foreign Application Priority Data

Dec. 10, 1996 [DD] German Dem. Rep. .......... 196512743

[51] Int. Cl.$^7$ ................................. H04M 1/24
[52] U.S. Cl. ................. 379/1; 379/12; 379/16; 379/22; 379/27
[58] Field of Search ............... 379/1, 9–10, 15, 379/27–29, 34, 142, 243, 245, 106.05, 106.09, 12, 16, 22

[56] References Cited

U.S. PATENT DOCUMENTS

| | | | |
|---|---|---|---|
| 4,466,092 | 8/1984 | Renner | 11/4 |
| 5,410,585 | 4/1995 | Kawaharata | 379/6 |
| 5,799,060 | 8/1998 | Kennedy et al. | 379/29 |
| 5,828,728 | 10/1998 | Hoy et al. | 379/29 |
| 5,857,011 | 1/1999 | Kennedy et al. | 379/21 |
| 5,875,230 | 2/1999 | Ganley et al. | 379/29 |

FOREIGN PATENT DOCUMENTS

| | | |
|---|---|---|
| 0337524 | 10/1989 | European Pat. Off. . |
| 198808 | 8/1985 | Hungary . |
| 204639 | 4/1989 | Hungary . |
| 56-110378 | 9/1981 | Japan . |
| 4111656 | 4/1992 | Japan ........................................ 1/24 |

OTHER PUBLICATIONS

"The GSM System for Mobile Communications," Michel Mouly and Marie–Bernadette Pautet, pp. 78–185, 1992.

*Primary Examiner*—Curtis A. Kuntz
*Assistant Examiner*—Binh K. Tieu
*Attorney, Agent, or Firm*—Burns, Doane, Swecker & Mathis, L.L.P.

[57] ABSTRACT

The present invention relates to a method of testing voice paths in telecommunications systems where said voice paths include voice compression and decompression, and to an apparatus for achieving the same. More specifically, it relates to such a method and apparatus, where the method comprises establishing a voice path including voice compression and decompression between a first telephone and a second telephone both involved in a call between at least two telephones, generating a signal uniquely identifying the first telephone, transmitting the signal from the first telephone, and monitoring the second telephone for reception of the signal at the second telephone via the voice path established between the first and second telephones.

35 Claims, 7 Drawing Sheets

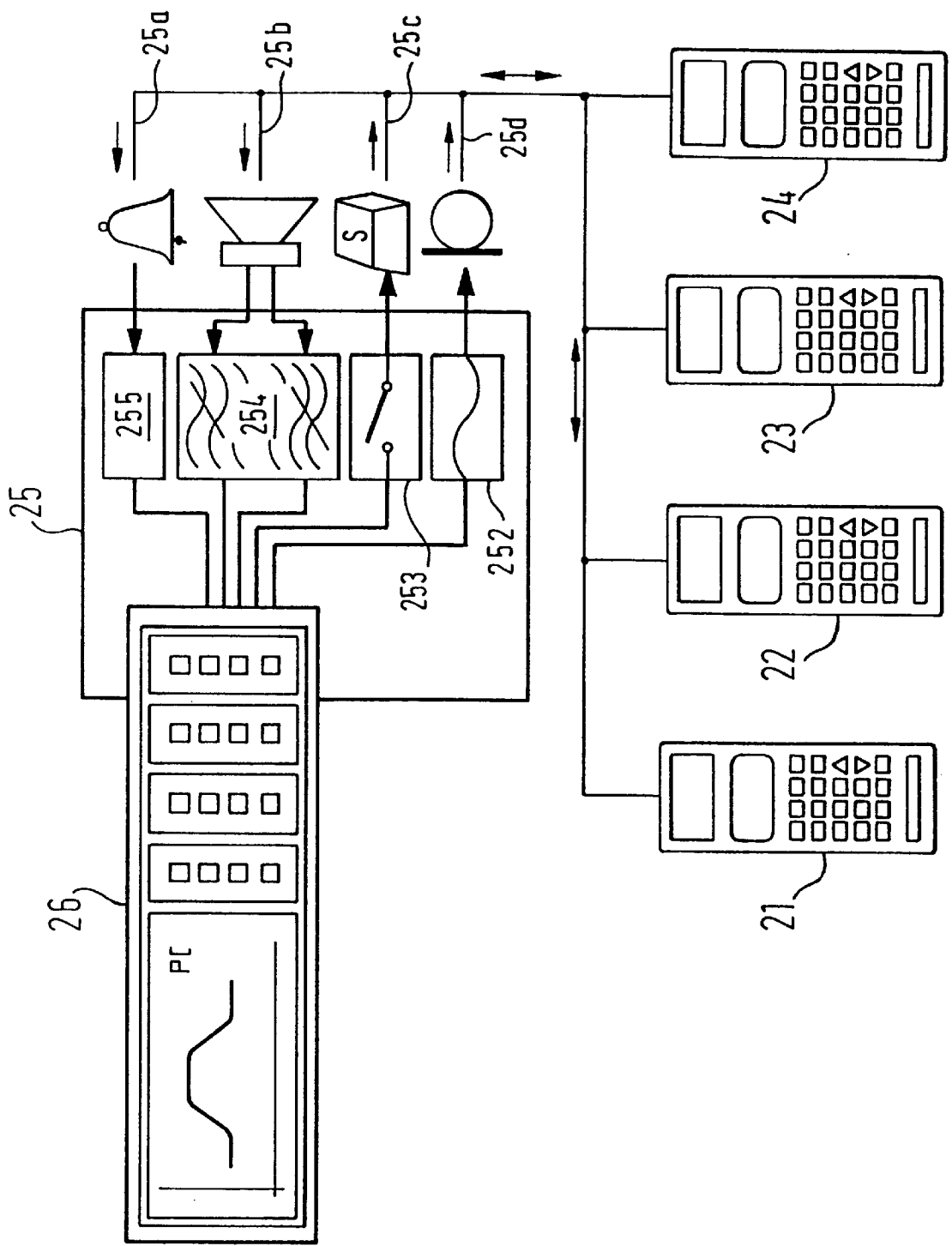

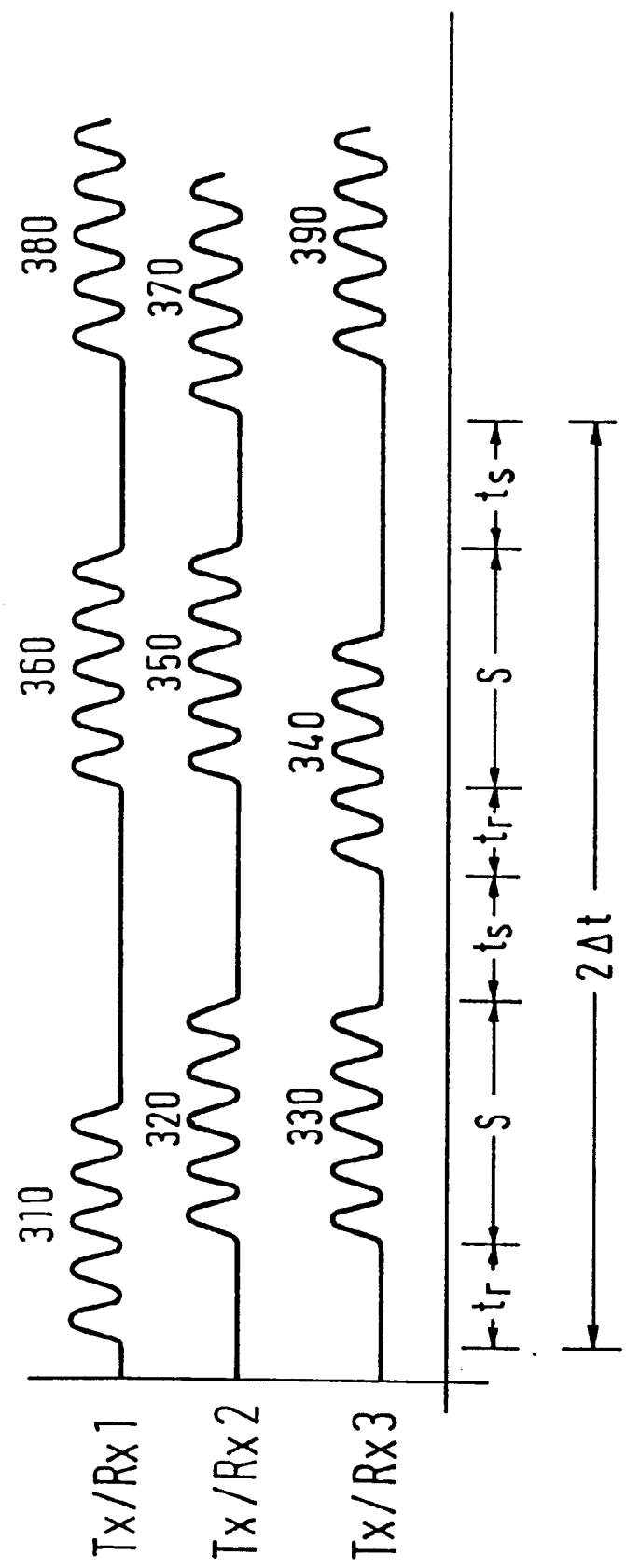

VOICE PATH TESTING IN TELECOMMUNICATIONS SYSTEM

FIELD OF THE INVENTION

The present invention relates to a method of testing voice paths in telecommunications systems where said voice paths include voice compression and decompression, and to an apparatus for achieving the same. More specifically, it relates to such a method and apparatus, where the method comprises establishing a voice path including voice compression and decompression between a first telephone and a second telephone both involved in a call between at least two telephones, generating a signal uniquely identifying the first telephone, transmitting the signal from the first telephone, and monitoring the second telephone for reception of the signal at the second telephone via the voice path established between the first and second telephones.

BACKGROUND OF THE INVENTION

A trivial example of such a method is as follows. (a) Establish a voice path between a first telephone and a second telephone in a telecommunications system where said voice path includes voice compression and decompression (such as a mobile telecommunications system) by taking the first telephone off-hook, dialing the number of the second telephone on the key pad of the first telephone and taking the second telephone off-hook when it rings in response to this dialing. The first telephone and the second telephone are thus involved in a straightforward two-way call in which a first voice path connects the first telephone to the second telephone and a second voice path connects the second telephone to the first telephone. (b) Say "telephone 1" into the microphone of the first telephone; and (c) listen to the loudspeaker of the second telephone for reception of the message "telephone 1" at the second telephone via the first voice path established between the first and second telephones. Since voice compression algorithms used in telecommunications systems with voice compression and decompression are optimized for transmission of human speech, the message "telephone 1", when received at the second telephone, will be recognizable enough to identify the source of the message as the first telephone for a listener at the second telephone already aware that the message "telephone 1" uniquely identifies the first telephone. More complicated examples than the trivial example just given may be constructed by including such features of present-day telecommunications systems as call forwarding, conference calling and call waiting, so that the first telephone and the second telephone may instead be involved in a complex asymmetrical call between more than two telephones.

A variety of known methods of testing voice paths in telecommunications systems where said voice paths include voice compression and decompression have focused on the manual execution of test cases similar to the trivial example just described. Such manual testing involves a human tester speaking into the first telephone and either the same or a different tester listening at the second telephone for reception of the transmitted voice signal. This practice, although easily implemented, has certain problems and disadvantages, mostly arising from the limitations inherent in using a human tester to execute test cases.

Firstly, such manual testing prevents the accurate reproduction of previously conducted test cases. Accurate reproduction of a previously conducted test case may be required when the telecommunications system containing the voice path being tested has been modified or upgraded, and it is required to test for correct functioning of the modified or upgraded system, or that a fault previously present in the unmodified system has been corrected. Such accurate reproduction of a test case may also be required when a previously conducted test case has indicated a fault in the telecommunications system containing the voice path being tested and it is required to repeat the previously conducted test case to help establish the cause of the fault. Especially in the latter case, the reproduction of test cases with a timing as accurate as possible is required, something which manual testing cannot provide.

Secondly, manual testing cannot be used to execute test cases which in themselves require critical timing or accuracy. The execution of test cases requiring such critical timing or accuracy may be required to reveal faults in the telecommunications system containing the voice path being tested which would not otherwise be detectable by executing only approximate test cases.

Thirdly, it is impractical to use manual testing in a variety of situations, such as to execute test cases lasting a long time, where continuous testing of a voice path over a longer period of time, i.e. a period of 24 hours or seven days, may be required to detect faults not detectable by the execution of test cases lasting shorter periods of time. On the other hand, manual testing in itself is inherently time-consuming because the manual execution of a single test case may take many minutes on account of the inherent limitations of human testers. This has the disadvantage that the number of test cases that can be executed in a given period of time is severely restricted.

Finally, manual testing cannot be performed without the presence of a human tester. Thus, manual execution of test cases for testing voice paths in telecommunications systems has certain problems and disadvantages associated with it.

Known methods for testing voice paths in telecommunications systems where said voice paths include voice compression and decompression have also focused on interrogating components of the telecommunications system containing the voice path being tested from a telephone at one end of the voice path using test routines designed for that purpose. In a mobile telecommunications system, for example, the components of the system which are interrogated might include a mobile services switching center (MSC), a base station controller (BSC) and/or a base transceiver station (BTS). However, such interrogation of the components of a telecommunications system has the disadvantage that it only tests a part of a voice path at a time, and does not test a complete voice path from first telephone to second telephone all at the same time. It also has the problem that although such interrogation of the components of a telecommunications system can be used to confirm that the interrogated components function correctly in the test conditions, it cannot be used to confirm that they will function correctly when integrated into the complete voice path.

DE 32 11 967 C2 describes a method of testing the operation of a computer aided communication switching device, especially for traffic-simulation in telecommunication systems. A plurality of connections can be established between pairs of user-simulators and the reaction of the respective telecommunication system can be tested. Further, the transmission of tone pulses between two user simulators, involved in a call, can be observed. However, an identification of the source of the transmitted tone pulses is not performed, since always only two user simulators are connected to each other. The method described in DE 32 11 967

C2 therefore does not allow the required comprehensive testing of voice paths in telecommunication systems.

Thus, known methods for testing voice paths in telecommunications systems with voice compression and decompression have certain problems and disadvantages, and demonstrate the need for an improved method of testing voice paths in telecommunications systems where said voice paths include voice compression and decompression.

SUMMARY OF THE INVENTION

It is object of the invention, to provide an improved method and apparatus for testing voice paths between at least two telephones in a telecommunications system which includes voice compression and decompression.

According to one aspect, the invention provides a method of testing a voice path in a telecommunications system where said voice path includes voice compression and decompression, the method comprising the steps of establishing a voice path including voice compression and decompression between a first telephone and a second telephone both involved in a call between at least two telephones, coding information uniquely identifying the first telephone into a pattern of tone pulses, repetitively transmitting examples of said pattern of tone pulses from the first telephone at a repeated transmission frequency, and monitoring the second telephone for reception of at least one of said examples of the pattern of tone pulses at the second telephone via the voice path established between the first and second telephones.

According to another aspect of the invention, the method of testing a voice path in a telecommunications system where said voice path includes voice compression and decompression, the method comprising the steps of establishing a voice path including voice compression and decompression between a first telephone and a second telephone both involved in a call between at least two telephones, coding information uniquely identifying the first telephone into a pattern of tone pulses, repetitively transmitting examples of said pattern of tone pulses from the first telephone at a repeated transmission frequency, monitoring the second telephone for reception of at least one of said examples of the pattern of tone pulses at the second telephone via the voice path established between the first and second telephones and issuing a warning that the voice path between the first and second telephones is interrupted, if a first one of said examples of the pattern of tone pulses transmitted from the first telephone is not received at the second telephone during said monitoring step.

According to another aspect, the invention provides a method of testing a voice path in a telecommunications system where said voice path includes voice compression and decompression, where the telecommunications system is a GSM system, the method comprising the steps of establishing a voice path including voice compression and decompression between a first telephone and a second telephone both involved in a call between at least two telephones, coding information uniquely identifying the first telephone into a pattern of tone pulses, repetitively transmitting examples of said pattern of tone pulses from the first telephone at a repeated transmission frequency, monitoring the second telephone for reception of at least one of said examples of the pattern of tone pulses at the second telephone via the voice path established between the first and second telephones, and wherein said pattern of tone pulses comprises i sinewave tone pulses, each having a respective duration, $d_i$, equal to an integral multiple of a first time interval, $t_d \geq 25$ ms, and j silent periods, each having a respective duration, $p_j$, equal to an integral multiple of a second time interval, $t_p \geq 50$ ms, where $i \geq 1$ and $j \geq 0$; $i, j \in$ {Integers}, such that the total duration, S, of said pattern of tone pulses given by $$S = S_i d_i + S_j p_j$$

is such that:

$S \leq 260$ ms, where $S_i d_i$ is the sum of the durations of the sinewave tone pulses and $S_j p_j$ is the sum of the durations of the silent periods in the pattern of tone pulses.

The method according to the invention allows the testing of a voice path in a telecommunications system, where said voice path includes voice compression and decompression. The method comprises the steps of: establishing a voice path including voice compression and decompression between a first telephone and a second telephone both involved in a call between at least two telephones, generating a pattern of tone pulses uniquely identifying the first telephone, repetitively transmitting examples of said pattern of tone pulses from the first telephone at a repeated transmission frequency, and monitoring the second telephone for reception of at least one of said examples of the pattern of tone pulses via the voice path established between the first and second telephones.

The use of patterns of tone pulses allows to identify a plurality of telephones involved in a call and thus not only the establishing of the voice path itself is tested, but also the correct routing of the call to an predetermined receiving telephone and further, their repetitive transmission of the pattern of tone pulses allows a continuous monitoring of the voice path.

Further, the method according to the invention describes to generate 36 different patterns of tone pulses for transmission from a first telephone over a voice path in a telecommunications system where said voice path includes voice compression and decompression to a second telephone.

Moreover, the present invention provides an apparatus for generating a pattern of tone pulses uniquely identifying a first telephone and for repetitively transmitting examples of said pattern of tone pulses at a repeated transmission frequency from the first telephone over a voice path in a telecommunications system where said voice path includes voice compression and decompression to a second telephone.

As mentioned above, voice compression algorithms used in telecommunications systems are optimized for transmission of human speech. Therefore, in methods of testing voice paths in telecommunications systems where said voice paths include voice compression and decompression, various constraints, described in greater detail below, are imposed on the type of signal that can be transmitted from a first telephone via a voice path being tested to a second telephone, if the signal is not to be corrupted during transmission to such an extent that part or all of the information contained in the signal is lost during transmission.

The present invention has the advantage that it automates methods of testing voice paths in telecommunications systems where said voice paths include voice compression and decompression, whilst at the same time meeting the various constraints imposed by voice compression algorithms optimized for human speech. In other words, the examples of patterns of tone pulses transmitted in the method of the present invention are signals which are not corrupted during transmission over a voice path including voice compression and decompression to such an extent that information contained in them to identify the first telephone is lost during transmission. The present invention thus overcomes the problems presently existing with manual testing.

The present invention is applicable to testing voice paths including voice compression and decompression in a variety of different telecommunications systems operating in the 450 to 2000 MHz frequency band, including, but not restricted to, GSM, PDC, ADC, PCN, NMT 900 and TACS, all of which are acronyms of telecommunications systems familiar to a person skilled in the art. One embodiment of the present invention, described in greater detail in relation to FIG. 4, below, is particularly suited to testing voice paths in the GSM system. GSM (which stands for Global System for Mobile communications) is a telecommunications system operational in a range of countries world-wide, including in Europe, South Africa and Japan.

For example, in the United Kingdom, the proprietary mobile telecommunications systems of Vodafone and Cellnet are both GSM systems. The reader is referred to Michel Mouly and Marie-Bernadette Pautet: "The GSM System for Mobile Communications", Palaiseau, France, 1992 (ISBN: 2 9507190 0 7) for further details of the GSM system.

The present invention may be applied to voice path testing in a variety of situations in which at least two telephones are connected via voice paths in a telephone call. As should already be apparent, a voice path is defined as a unidirectional path between two telephones in a call; thus, in a straightforward two-way call between two telephones for example, two voice paths running in opposite directions are present. It is not a necessary feature of the present invention that all of the voice paths connecting the telephones in a call should be tested in the manner of the present invention, although it is clearly advantageous to do so in order to help confirm correct functioning of all of the voice paths in the call. As will become apparent in the description which follows, the number of telephones, labeled N, at the start of a voice path subject to testing in the manner of the present invention—in other words, the number of telephones selected to be the first telephone according to the method of the present invention—is the number of telephones which determines some of the preferred features of the invention, rather than the total number of telephones in the call. As will also become apparent, a particular telephone in a call does not have to remain the first telephone at all times. A particular telephone must be selected for transmitting an example of a pattern of tone pulses uniquely identifying that particular telephone to be described as the first telephone, but the first telephone may be repeatedly re-selected from the plurality of telephones in the call during a sequence of voice path testing according to the present invention.

BRIEF DESCRIPTION OF THE DRAWINGS

The present invention will now be described further with reference to the accompanying drawings, in which:

FIG. 2 schematically shows the connection of four telephones to a telephone operating device, hardware and software for controlling, monitoring and analyzing the telephones or signals during voice path testing;

FIG. 3a is a timing diagram for a call in which three telephones are cyclically selected for testing voice paths established between the three telephones;

DETAILED DESCRIPTION

Figure 1:
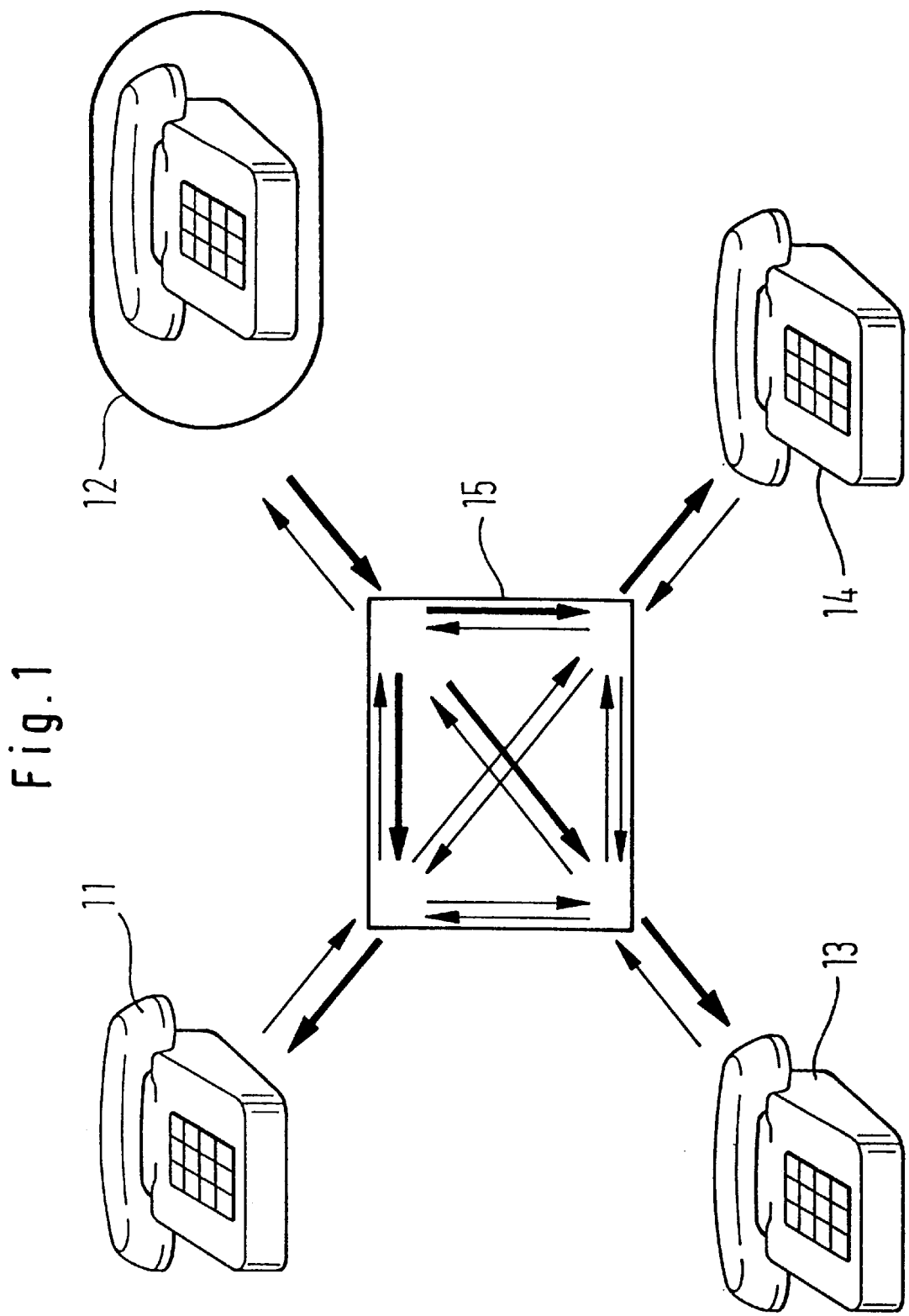
FIG. 1 shows a stage in a cycle of voice path testing involving four telephones.

With FIG. 1 the voice path testing method of the present invention is explained. FIG. 1 shows a stage in a cycle of voice path testing involving four telephones, 11, 12, 13 and 14, in other words a cycle in which the number of telephones N=4. The telephone operating device 15 is provided for generating the identifying signals, for transmitting the signals between the telephones (via the telecommunications system) and for monitoring the telephones. In FIG. 1, telephone 12 is transmitting an example of a pattern of tone pulses uniquely identifying telephone 12 over the voice paths to telephones 11, 13 and 14. Bold arrows represent partitions of voice paths carrying transmitted examples of patterns of tone pulses, whilst feint arrows represent other voice paths connecting the four telephones. Because telephones 11, 12, 13 and 14 are maximally connected via voice paths in a four-way conference call, there is a total of $N^2-N=12$ voice paths connecting the four telephones. In the shown step three of this total of 12 voice paths are tested per transmitted example of a pattern of tone pulses.

In FIG. 1, the telephone transmitting an example of a pattern of tone pulses uniquely identifying the transmitting telephone is circled. The shown stage in the cycle of voice path testing shown in FIG. 1 is followed by stages in which, i.e., firstly telephone 14 transmits an example of a pattern of tone pulses uniquely identifying telephone 14 over the voice paths to telephones 11, 12 and 13, and then telephone 13 transmits an example of a pattern of tone pulses uniquely identifying telephone 13 over the voice paths to telephones 11, 12 and 14, and then likewise telephone 11 transmits identifying tone pulses, thus completing one cycle of voice path testing. Naturally, sequences of telephones different from the one described are possible. This completed cycle of voice path testing is one cycle from a repeating sequence of voice path testing cycles in which, i.e., the telephones 11, 12, 13 and 14 are cyclically selected in the order . . . 12, 14, 13, 11, 12, 14, 13, 11, 12, 14, 13 . . . to transmit examples of patterns of tone pulses routed to the telephones from a device for generating tone pulse patterns (such as those shown in FIGS. 3a to 3f).

During testing, the telephone operating device is responsible for accessing the key matrices of the telephones, i.e. for dialing, for transmitting signals through voice paths established by the telecommunication system and for monitoring the telephones for reception of the transmitted patterns of tone pulses. The telephone operating device itself may receive commands and instructions for generating tone patterns, for dialing, monitoring telephones, and the like from a central processing unit, which may include a computer.

To allow the testing of voice paths as described with reference to FIG. 1, the telephones must be accessible by the telephone operating device. The connection between the telephone operating device and a telephone may be made by adding a pin connector to the telephone, by means of which the telephone operating device can be connected to the telephones to transmit patterns of tone pulses to the microphones. The same pin connector is preferably also used to connect the telephone to the telephone operating device for controlling the key matrix of the telephone to establish a voice path with at least one other telephone, for monitoring the buzzer or bell of the telephone for initial establishment of a voice path with at least one other telephone, and/or for monitoring the loud-speaker of the telephone for reception of examples of a pattern of tone pulse identifying the other telephone via the voice path established between the two telephones.

Connection between a telephone operating device to four telephones via such a pin connector is shown schematically in FIG. 2, in which reference numerals 21 to 24 denote telephones having microphones, matrices of push-button keys, loudspeakers and buzzers or bells. In FIG. 2, reference numeral 25 denotes a telephone operating device comprising: (a) an arrangement 252 for generating examples of patterns of tone pulses uniquely identifying the telephones 21 to 24 for transmission by the microphones of the telephones, (b) apparatus 253 for controlling the matrices of push button keys of the telephones 21 to 24, (c) apparatus 254 for monitoring the loudspeakers of the telephones 21 to 24 for reception of examples of patterns of tone pulses transmitted from other telephones during voice path testing, and (d) apparatus 255 for monitoring the buzzers or bells of the telephones 21 to 24.

Reference numeral 25a represents lines between the telephones and the telephone operating device through which signals are transmitted from the buzzers of the telephones, 25b represents such lines by which signals are transmitted from the speakers of the telephones, 25c stands for such lines through which signals are transmitted to the key matrices of the telephones and reference numeral 25d finally represents lines between the telephones and the telephone operating device through which signals are transmitted to the microphones of the telephones.

The loudspeaker monitoring apparatus 254 includes a first bandpass filter tuned to the sinewave frequency of the tone pulses used in voice path testing and a second bandpass filter which can be used to monitor other signals received over a voice path, such as messages. The buzzer monitoring apparatus 255 may also include a bandpass filter tuned to the frequency of the buzzers or bells. The telephone operating device 25 is controlled by means of appropriate hardware and software 26, which is also used to record and analyze the tone pulse patterns received by the loudspeaker monitoring apparatus 254. The telephone operating device 25 and the hardware and software 26 are preferably embodied by an Air Interface and Mobile Subscriber Simulator (AIMS) available from Telefonaktiebolaget LM Ericsson of Stockholm, Sweden.

The loudspeaker monitoring apparatus 254 may be used to read examples of patterns of tone pulses received at one (in other examples also more than one) of the telephones 21 to 24, and thus to identify the respective origins of the received examples according to the respective telephones uniquely identified by the respective patterns of tone pulses which the received examples represent. The loudspeaker monitoring apparatus 254 may also be used such that if a first one of the examples of a particular pattern of tone pulses is not received at the telephone when it is expected to be received by extrapolating from the time of reception of a previous similar example, a warning is issued by the loudspeaker monitoring apparatus 254 to the hardware and software 26 that the voice path between the respective telephones is interrupted. This monitoring may be further extended such that if a second example of the particular pattern of tone pulses is received at one of the telephone within a first predetermined time period starting from when the first example was not received at the telephone, an indication is issued by the loudspeaker monitoring apparatus 254 to the hardware and software 26 that the voice path has been re-established. Alternatively, if no example of the particular pattern of tone pulses is received at the telephone within a second predetermined time period, an indication is issued by the loudspeaker monitoring apparatus 254 to the hardware and software 26 that the transmission has been terminated.

The telephone operating device 25 may be further adapted such that if the apparatus 253 for controlling the key matrices of the telephones 21 to 24, is used to put one of the telephones on hold, for example, telephone 21, whereby the repetitive transmission of examples of a pattern of tone pulses uniquely identifying the telephone 21 is interrupted. Furthermore, in this case, if telephone 21 is put on hold, the telephone operating device 25 monitoring the loudspeaker of the telephone 21 will not expect to receive any patterns of tone pulses.

FIG. 3a is a timing diagram for a call in which three telephones are cyclically selected for testing voice paths established between the three telephones, i.e. a call in which N=3. In FIG. 3a, time runs along the abscissa. Tx/Rx 1, Tx/Rx 2 and Tx/Rx 3 respectively represent the transmitting/receiving portions of telephone 1, telephone 2 and telephone 3, which are the three telephones selected in the voice path testing cycle. The timing diagram of FIG. 3a shows one complete cycle in which Tx/Rx 1, Tx/Rx 2 and Tx/Rx 3 respectively transmit an example of respective patterns of tone pulses, respectively identifying telephone 1, telephone 2 and telephone 3. Transmission or reception of an example of one of the three different patterns of tone pulses at one of Tx/Rx 1, Tx/Rx 2 and Tx/Rx 3 is represented in FIG. 3a by a wavy line. A period during which Tx/Rx 1, Tx/Rx 2 or Tx/Rx 3 is neither transmitting nor receiving an example of one of the three different patterns of tone pulses is represented in FIG. 3a by a straight line.

The sequence of events in one complete cycle of voice path testing, as shown in FIG. 3a, will now be described. An example 310 of a pattern of tone pulses uniquely identifying telephone 1 is transmitted from Tx/Rx 1 at the start of the cycle. This example 310 is received as 320 at Tx/Rx 2 and as 330 at Tx/Rx 3 after a signal relay time, $t_r$. $t_r$ is the time taken for a signal to be relayed from one telephone over a voice path to another telephone in the telecommunications system. In the GSM system, $t_r$ is typically 140 ms, composed of 20 ms for the signal to be compressed according to the GSM voice compression algorithm, 100 ms transit time and a further 20 ms for the received signal to be decompressed according to the same GSM voice compression algorithm. Upon receipt at Tx/Rx 2, the pattern of tone pulses of example 320 is read to identify the source of example 320 as telephone 1, and thus to confirm that at this stage in the cycle, the voice path from telephone 1 to telephone 2 is intact. Similarly, the pattern of tone pulses of example 330 is read upon receipt at Tx/Rx 3 to identify the source of example 330 also to be telephone 1, and thus to confirm that at this stage in the cycle, the voice path from telephone 1 to telephone 3 is intact.

In FIG. 3a, $t_s$ represents a safety margin between the end of transmission or reception of one example of a pattern of tone pulses at one of the three telephones and the start of transmission or reception of the next successive example of a pattern of tone pulses at the same telephone. This safety margin is required to avoid successive examples of patterns of tone pulses from interfering with each other and is preferably chosen to be greater than or equal to 100 ms for voice path testing in the GSM system. Thus, after the end of the reception of example 330 at Tx/Rx 3 and after the end of such a safety margin $t_s$, an example 340 of a pattern of tone pulses uniquely identifying telephone 3 is transmitted from Tx/Rx 3. This example 340 is received as 350 at Tx/Rx 2 and as 360 at Tx/Rx 1 after the signal relay time, $t_r$. Upon receipt at Tx/Rx 2, the pattern of tone pulses of example 350 is read to identify the source of example 350 as telephone 3, and thus to confirm that at this stage in the cycle, the voice path from telephone 3 to telephone 2 is intact. Similarly, the pattern of tone pulses of example 360 is read upon receipt at Tx/Rx 1 to identify the source of example 360 also to be telephone 3, and thus to confirm that at this stage in the cycle, the voice path from telephone 3 to telephone 1 is intact.

After the end of the reception of example 350 at Tx/Rx 2 and after the end of another safety margin ts, an example 370 of a pattern of tone pulses uniquely identifying telephone 2 is transmitted from Tx/Rx 2. This example 370 is received as 380 at Tx/Rx 1 and as 390 at Tx/Rx 3 after the signal relay time, tr. Upon receipt at Tx/Rx 1, the pattern of tone pulses of example 380 is read to identify the source of example 380 as telephone 2, and thus to confirm that at this stage in the cycle, the voice path from telephone 2 to telephone 1 is intact. Similarly, the pattern of tone pulses of example 390 is read upon receipt at Tx/Rx 3 to identify the source of example 390 also to be telephone 2, and thus to confirm that at this stage in the cycle, the voice path from telephone 2 to telephone 3 is intact. This completes the description of one complete cycle of voice path testing, as shown in FIG. 3a, in which all six of the voice paths between telephones 1, 2 and 3 are tested.

FIG. 3a shows only one cycle from a repeating sequence in which the three telephones in the call are cyclically selected in the order . . . 3, 2, 1, 3, 2, 1, 3, 2, 1 . . . to repeatedly transmit respective examples of respective patterns of tone pulses respectively identifying the three telephones. For a voice path testing cycle involving N telephones, all of which are connected via voice paths to each other, the total number of voice paths to be tested in the cycle is $N^2-N$. Of these, N-1 voice paths between the N telephones are tested per transmitted example of each of the N different patterns of tone pulses. Thus in the case shown in FIG. 3a in which N=3 and all of the three telephones involved are connected via voice paths to each other, two voice paths are tested per transmitted example of a pattern of tone pulses, as was described above. The maximum value of $N^2-N$ voice paths to be tested in the voice path testing cycle is for maximal connection via voice paths of all of the telephones involved in the voice path testing. The actual value of the total number of voice paths to be tested may be less than this maximum value, depending on how the telephones are interconnected. For example, for a voice path testing cycle involving three telephones, namely telephone 4, telephone 5 and telephone 6, in which telephone 4 is connected to telephone 5 via a voice path and vice versa telephone 5 to telephone 4 and telephone 4 is also connected to telephone 6 via a voice path and vice versa telephone 6 to telephone 4, but in which there is no connection between telephone 5 and telephone 6 via a voice path, the total number of voice paths to be tested per cycle will be 4, and not the maximum value of 6.

The time between the transmission of an example of a pattern of tone pulses identifying a telephone and of the next successive example of the same pattern of tone pulses identifying the same telephone is given by NΔt, where Δt is the time difference between selecting one of the telephones in the cycle of voice path testing (e.g. telephone 1 in FIG. 3a) to transmit an example of a pattern of tone pulses identifying that telephone and selecting the next successive telephone in the voice path testing cycle (e.g. telephone 3 in FIG. 3a) to transmit an example of a pattern of tone pulses identifying that next successive telephone. The frequency, f, of repeated transmission of examples of particular patterns of tone pulses uniquely identifying different telephones in the voice path testing cycle is therefore given by:

$$f=1/(N\Delta t).$$

It is clearly desirable that as the number, N, of telephones selected per cycle of voice path testing is increased, the repeated transmission frequency, f, should not be allowed to fall too low, otherwise repeated testing of any particular voice path in the voice path testing cycle will not occur as often as required to detect interruptions in that particular voice path with a high probability. Δt is therefore preferably chosen to have a value less than or equal to 500 ms in the GSM system.

From the values given above for the time difference, Δt, between successive transmissions of examples of tone pulse patterns, the relay time, $t_r$, and the safety margin, $t_s$, it is now possible to calculate a maximum value for the total duration, S, of a pattern of tone pulses for use in voice path testing in the GSM system, thus:

$$S \leq \Delta t - (t_r + t_s)$$

$$\Rightarrow S \leq 260 \text{ ms}.$$

Clearly, if Δt is chosen to have a value other than the value of 500 ms mentioned above, the maximum value of S will be correspondingly increased or reduced. Similarly, if the signal relay time, $t_r$, is increased or reduced or if the safety margin, $t_s$, is likewise adjusted from the value of 100 ms given above, the maximum value of S will be correspondingly reduced or increased.

The maximum value for the total duration, S, of a pattern of tone pulses places one constraint on patterns which can be used for voice path testing in the GSM system. A second constraint is placed on the patterns of tone pulses by the type of voice compression used in the GSM system. This reduces a 64 kilobit/s input data rate to a 16 kilobit/s rate for data transfer over a voice path between two telephones. A signal compressed for transmission over a voice path is subsequently decompressed upon receipt according to the same voice compression algorithm. Thus, each tone pulse in a pattern for use in voice path testing in the GSM system should have a duration, d, greater than 20 ms, otherwise such tone pulses risk being removed completely by the GSM compression and decompression processes during transmission of a pattern. In addition, each silent period between two successive tone pulses in such a pattern should have a duration, p, greater than or equal to 50 ms to avoid the two successive tone pulses from being merged into a single tone pulse by the voice compression algorithm. A third constraint is placed on the patterns of tone pulses which can be used for voice path testing in the GSM system by the requirement that there should be a sufficient number of different tone pulse patterns available for use in the voice path testing. Whether or not this third constraint is met will depend upon the number of different tone pulse patterns required for voice path testing, in other words, on the value of N. The lower the value of N, the easier it is to meet this third constraint whilst also meeting the first and second constraints described above.

It is further preferable, that the frequency of a sinewave used to generate the tone pattern is below the upper limit of the bandwidth of the transmission channel. Further, since the voice compression algorithms used in telecommunications systems as GSM suppress DC/low frequency components, it is preferable, that the frequency of the sinewave is above a certain lower limit. In a GSM telecommunications system, a preferred bandwidth for the sinewave is 300 Hz to 1.33 kHz.

Still further, since linear predictive coding (LPC) is used for voice compression in GSM systems, it is preferable, that the duration of the tone pulses used is longer than the width of the code-window used for the coding algorithm.

FIGS. 3b to 3f schematically represent five alternative arrangements for generating tone pulse patterns for transmission in voice path testing. In FIGS. 3b to 3f, reference numeral 30 denotes a number generating unit for generating a repeating sequence of different binary numbers at a parallel output. Each different binary number thus generated can be used to uniquely identify a respective one of the telephones involved in the voice path testing. The number generating unit 30 may embodied, for example, by a shift register of D flip-flops clocked at a frequency of $1/\Delta t$ and generating N different possible binary numbers at its output, where $\Delta t$ and N have the same meanings as given above. Reference numeral 31 in FIGS. 3b to 3f denotes a universal asynchronous receiver/transmitter (UART), which converts the parallel output of the number generating unit 30 into a serial stream of binary digits (or bit-stream). Reference numeral 32 denotes a sinewave generator which generates a sinewave output in response to a high-level input and no output in response to a low-level input. Reference numeral 33 denotes a modulator/demodulator (or modem) which frequency modulates a single-frequency carrier wave in response to a bitstream input. Reference numeral 34 denotes a bilateral analogue switch which amplitude modulates a single-frequency carrier wave in response to a bitstream input.

Figure 3B:
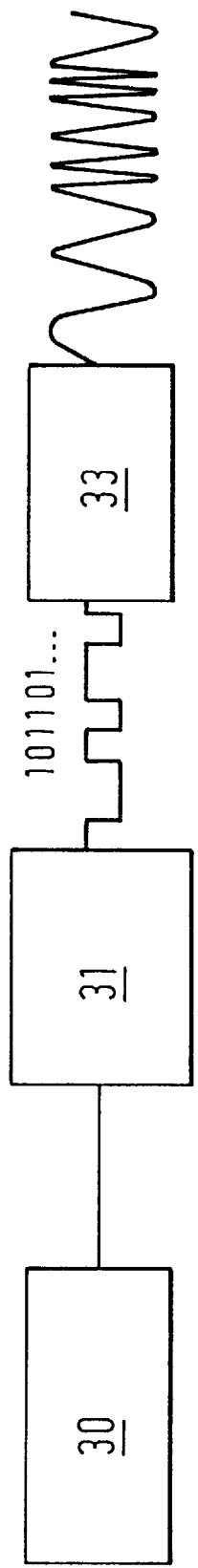
FIGS. 3b to 3f schematically represent five alternative arrangements for generating tone pulse patterns for transmission in voice path testing.

The construction and operation of the five alternative arrangements for generating tone pulse patterns shown in FIGS. 3b to 3f will now be described. In the arrangement of FIG. 3b, the number generating unit 30 supplies a repeating sequence of different binary numbers to the input of the UART 31. The digits of each different binary number are supplied in parallel to the UART 31, which converts each binary number thus received into a series bitstream. This series bitstream is then supplied to the input of the modem 33 which frequency modulates a single-frequency carrier wave in response to the bitstream thus received. The frequency modulated output generated by the modem 33 is subsequently routed by a telephone selector (not shown) to telephones cyclically selected by the telephone selector for transmitting the frequency modulated output over voice paths established between the telephones in the manner described with reference to FIG. 3a, above. The telephone selector, like the number generating unit 30, is clocked at a frequency of $1/\Delta t$, so that successive patterns of tone pulses output from the modem 33 are cyclically routed to the telephones involved in the voice path testing cycle with a frequency, f, for repeated transmission of examples of a particular pattern of tone pulses corresponding to one of the binary numbers generated by the number generating unit 30.

The arrangement for generating tone pulse patterns shown in FIG. 3b is not well suited for use in voice path testing in the GSM system because the frequency modulated patterns of tone pulses output from the modem 33 and routed by the telephone selector to the telephones do not meet the first and second constraints of the GSM system described above. Moreover, compression and subsequent decompression of a signal in the GSM system alters the frequencies and timing of the signal in such a way that, although imperceptible to the human ear, a bitstream representing a unique binary number, when frequency modulated, compressed according to the GSM voice compression algorithm for transmission, and decompressed upon receipt and subsequently demodulated, will result in a variety of different bitstreams representing different binary numbers. In other words, the one-to-one relationship between binary numbers and telephones is destroyed during transmission so that it is no longer possible to identify the source of an example of a pattern of tone pulses upon receipt and thus to confirm that a particular voice path is intact.

Figure 3C:
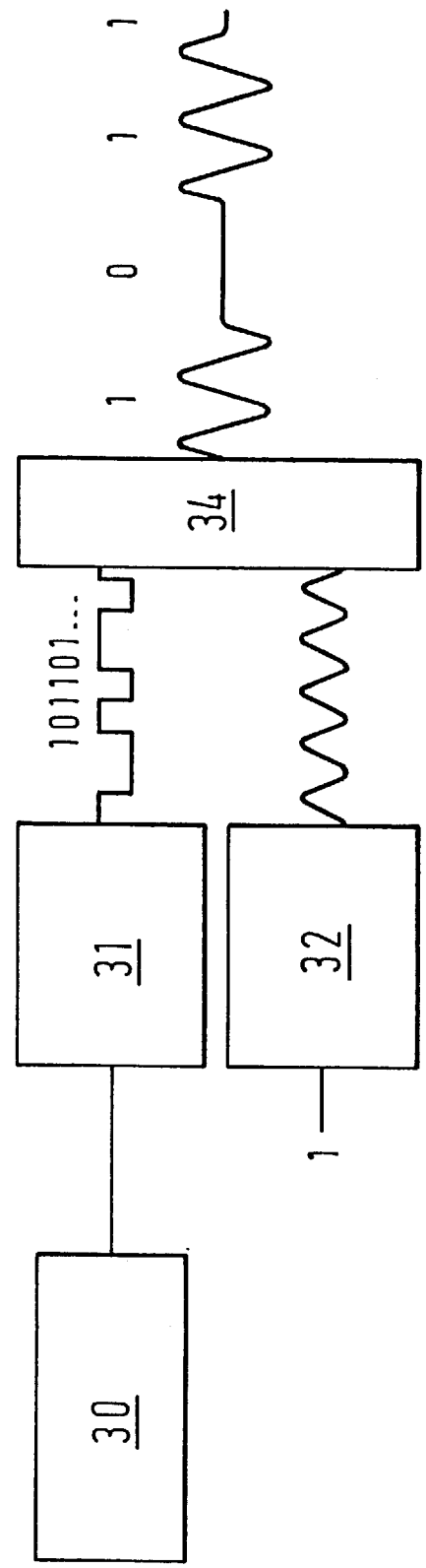

In the arrangement of FIG. 3c, the number generating unit 30 and the UART 31 are constructed and operated as in the arrangement of FIG. 3b. However, in the arrangement of FIG. 3c, the series bitstream output from the UART 31 is instead supplied to the input of the bilateral analogue switch 34. The sinewave generator 32 generates a constant sinewave output in response to a constant high-level input. This sinewave output is supplied to an input of the bilateral analogue switch 34, which amplitude modulates this sinewave input in response to the bitstream received from the UART 31. The amplitude modulated output generated by the bilateral analogue switch 34 is subsequently routed by a telephone selector (not shown) in a similar manner to that described with reference to FIG. 3b, above.

Although the amplitude modulated bitstream output from the arrangement of FIG. 3c can meet the second constraint imposed by the GSM system described above by giving each tone pulse representing a bit in the bitstream a minimum duration of 25 ms and by separating successive tone pulses by a silent period of minimum duration 50 ms, the first constraint of the GSM system described above can only be met by a pattern of such tone pulses which represents three bits or less. This is because the maximum total duration of a tone pulse pattern according to the first constraint of the GSM system is 260 ms, whereas three tone pulses of duration 25 ms separated by two silent periods of 50 ms give a total duration for a pattern of tone pulses of 225 ms. The addition of a fourth tone pulse representing a fourth bit and a third silent period to a three tone pulse pattern would add an extra 75 ms to the total duration of the tone pulse pattern, thus violating the first constraint. Accordingly, the third constraint of the GSM system described above can only be met for $N \leq 8$, since there are eight different possible three-bit binary numbers as $2^3 = 8$.

Figure 3D:
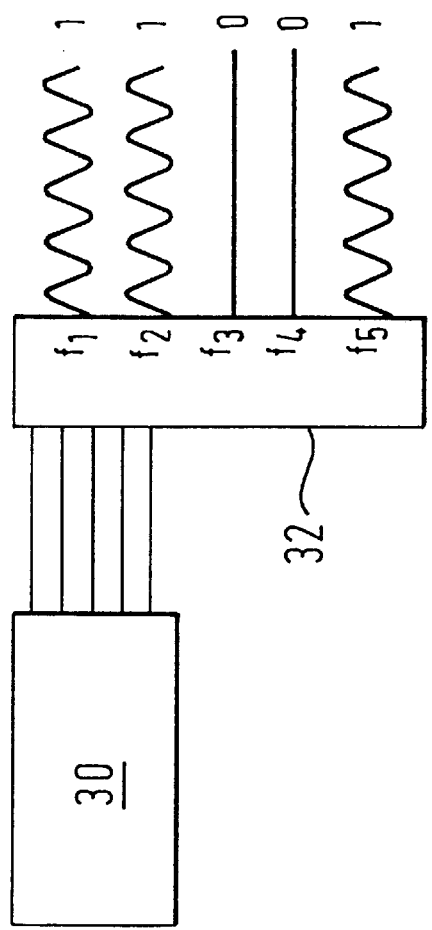

One possible arrangement for raising the maximum value of N above this value of 8 is shown in FIG. 3d. In this arrangement, the parallel output of the number generating unit 30 is supplied in parallel to a plurality of sinewave generators 32 (for example five sinewave generators, as shown in FIG. 3d) having respective outputs of different respective sinewave frequencies, $f_1$, $f_2$, $f_3$, $f_4$ and $f_5$. The sinewave outputs of these sinewave generators can be used to generate simultaneous tone pulses of duration 25 to 260 ms at five different frequencies (thus meeting the first and second constraints of the GSM system) which are subsequently routing by a telephone selector (not shown) in a similar manner to that described with reference to FIG. 3b, above.

Since the tone pulses thus produced are transmitted simultaneously at different frequencies, they could, in principle, be used to construct tone pulse patterns representing binary numbers of up to five bits. This would raise the maximum value of N to $2^5 = 32$. However, the bandwidth for transmission of signals over a voice path in the GSM system is relatively narrow, which means that the frequencies $f_1$, $f_2$, $f_3$, $f_4$ and $f_5$ must all be kept relatively close together, in order to fit into the band. And as has already been mentioned above, the voice compression algorithm of the GSM system alters the frequencies of a transmitted signal both during compression and during subsequent decompression. Accordingly, if the frequencies $f_1, f_2, f_3, f_4$ and $f_5$ are brought too close, tone pulses transmitted at these different frequencies will overlap and become scrambled either during voice compression, during subsequent decompression, or both. To avoid this scrambling of the tone pulses, it is found that the maximum number of different frequencies on which tone pulses can be transmitted within the bandwidth available in the GSM system is no greater than the number of bits which can be represented by the amplitude modulated tone pulse patterns generated by the arrangement of FIG. 3c. The arrangement of FIG. 3d thus can also only be used to a maximum value of N=8 in voice path testing in the GSM system.

Figure 3E:
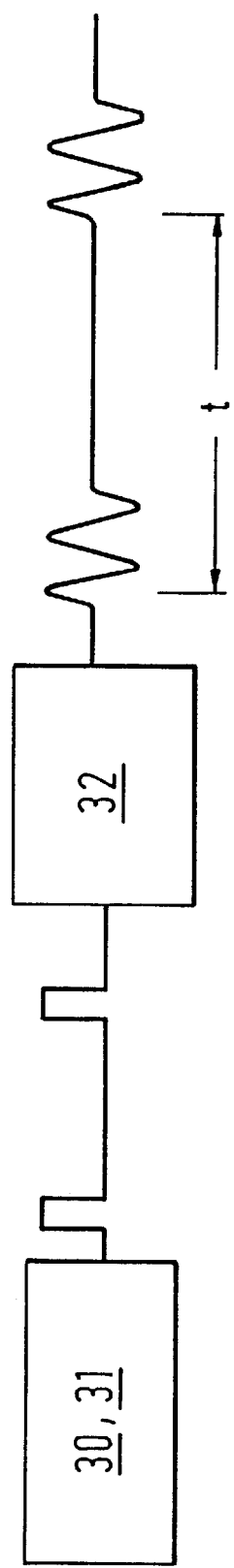
Figure 3F:
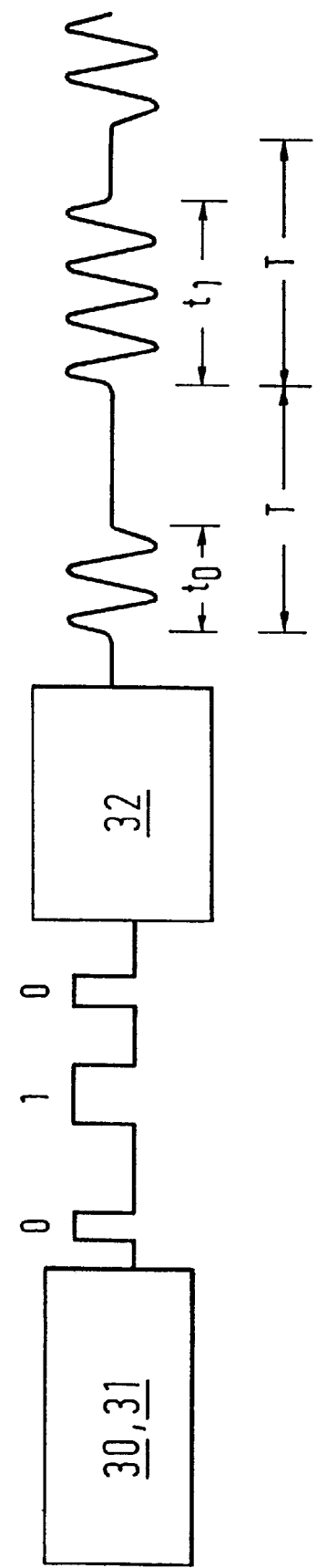

In the arrangements of FIGS. 3e and 3f, the number generating unit 30 and the UART 31 are represented for simplicity by a single box. In FIG. 3e, the number generating unit 30 and the UART 31 operate to supply a bitstream to the sinewave generator 32 which generates a sinewave tone pulse in response to a high-level input from the UART 31. The duration of each tone pulse is kept constant, but the information contained in the bitstream is encoded into a tone pulse pattern by varying the time of transmission, t, between successive tone pulses in the pattern. In this way, values of $N \leq 8$ may be encoded for voice path testing in the GSM system. This is because: (a) each tone pulse in the pattern must have a minimum duration of 20 ms so as not to be removed by the GSM voice compression algorithm. For safety reasons, however, often 25 ms are chosen as the preferred minimum duration of a tonepulse, as also used below; (b) each silent period between two successive tone pulses in the pattern must have a minimum duration of 50 ms to avoid the two successive tone pulses from being merged into a single tone pulse by the voice compression algorithm, thus allowing a maximum of three pulses to be transmitted during the maximum of 260 ms for the total duration of the pattern; and (c) each silent period between two successive tone pulses in the pattern should have a duration an integral multiple of the minimum duration of a silent period, thus permitting eight different possible tone pulse patterns, namely a pattern of a single pulse, four different patterns of two pulses separated by a silent period, and three different patterns of three pulses with two silent periods inbetween.

In FIG. 3f, the time of transmission, t, of each tone pulse is kept constant at a value t=T, but the information contained in the bitstream supplied from the UART 31 to the sinewave generator 32 is encoded into a tone pulse pattern by varying the duration of the tone pulses in the pattern between a first value, $t_0$, representing a zero bit, and a second value, $t_1$, representing a bit of one. In this way, values of $N \leq 8$ may be encoded for voice path testing in the GSM system. This is because: (a) $t_0$ must be $\geq 20$ ms so that pulses of duration $t_0$ are not removed by the GSM voice compression algorithm; (b) $t_1$ must be $\geq t_0 + 20$ ms so that pulses of duration $t_1$ remain distinguishable from pulses of duration $t_0$, which implies that $t_1$ must be $\geq 50$ ms; and (c) T must be $\geq t_1 + 50$ ms so that pulses of duration $t_1$ are not merged with successive pulses, which implies that T must be $\geq 100$ ms, thus allowing a maximum of 3 pulses of total duration $2T + t_1 \geq 250$ ms to be transmitted during the maximum total duration, S, of a single pattern of tone pulses of 260 ms, and permitting eight different possible tone pulse patterns, since, as already mentioned above, there are eight different possible three-bit binary numbers as $2^3 = 8$.

It should further be mentioned that in the arrangements of FIGS. 3e and 3f, the tone pulse patterns generated by the sinewave generator 32 are subsequently routed by a telephone selector (not shown) in a similar manner to that described with reference to FIG. 3f, above. This completes the description of the construction and operation of the five alternative arrangements for generating tone pulse patterns shown in FIGS. 3b to 3f.

The total number of different tone pulse patterns available for voice path testing may effectively be increased by combining the pulse distance approach described in relation to FIG. 3e, above, with the pulse duration approach described in relation to FIG. 3f, above.

Figure 4:
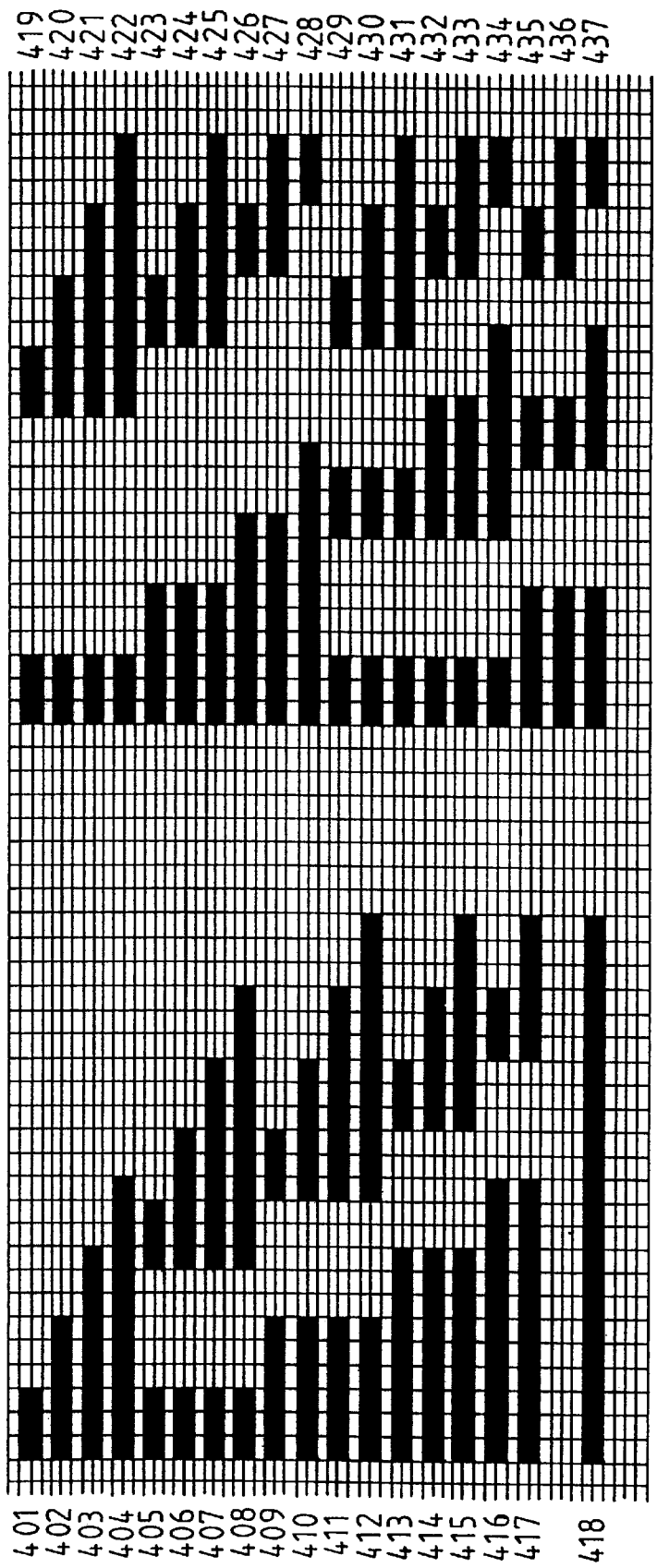
FIG. 4 schematically represents an "alphabet" of 36 different tone pulse patterns for transmission in voice path testing.

FIG. 4 schematically represents an "alphabet" of 36 different tone pulse patterns 401 to 417 and 419 to 437 derived in this way, in which each tone pulse has a duration equal to an integral multiple of 30 ms and each silent period between two successive tone pulses has a duration equal to an integral multiple of 50 ms, each division of the abscissa in FIG. 4 representing an interval of 10 ms. FIG. 4 also shows how this "alphabet" of 36 different tone pulse patterns may be enlarged by adding further different patterns of single pulses like tone pulse pattern 418, in which the single pulses have a duration greater than and distinguishable from the single pulses of patterns 401 to 404. In this way, the total number of different tone pulse patterns available for voice path testing may be increased to 40 or more. The "alphabet" of tone pulse patterns shown in FIG. 4 thus represents a preferred embodiment of tone pulse patterns for use when the method of the present invention is applied to the GSM system, since the tone pulse patterns represented in FIG. 4 meet the first and second constraints imposed by the GSM system described above and also meet the third constraint imposed by the GSM system for values of $N \leq 40$.

In the GSM system, interruptions in a voice path of up to 8 to 16 seconds (depending on circumstances) can be tolerated without the voice path being disconnected. This is to allow for real-life situations in which temporary interruption of a voice path is caused, for example, by the passage of one of the telephones connected via the voice path under a bridge or through a tunnel. The first and second predetermined time periods mentioned above are therefore preferably chosen to be just less than and just greater than, in other words practically equal to, the maximum duration of an interruption in a voice path which can be tolerated by the GSM system without the voice path being disconnected. The first and second predetermined time periods are therefore preferably chosen to be 8/f, where f has the same meaning as before.

The voice path testing method of the present invention may thus be adapted to testing voice paths in a variety of telecommunications systems, but particularly to testing voice paths in the GSM system.

For convenient reference, here is provided a Roman and Greek alphabetical list of the more important symbols used in the present description and claims:

| | |
|---|---|
| f | frequency of repetition for transmitting successive examples of a pattern of tone pulses uniquely identifying a telephone; |
| $d_i$ | respective duration of ith sinewave tone pulse; |
| $\Delta t$ | time difference between cyclically selecting a telephone for transmitting an example of a pattern of tone pulses uniquely identifying that telephone and selecting the next successive telephone in the cycle for transmitting an example of a pattern of tone pulses uniquely identifying that next successive telephone; |

-continued

| | |
|---|---|
| i | number of sinewave tone pulses in a single pattern of tone pulses; |
| j | number of silent periods in a single pattern of tone pulses; |
| N | number of telephones cyclically selected for successively transmitting examples of respective patterns of tone pulses uniquely identifying respective telephones in the cycle; |
| $p_j$ | respective duration of jth silent period; |
| S | total duration of a single pattern of tone pulses; |
| $S_i d_i$ | sum of durations of sinewave tone pulses in a single patttern of tone pulses; |
| $S_j p_j$ | sum of durations of silent periods in a single pattern of tone pulses; |
| $t_d$ | minimum duration of a sinewave tone pulse; |
| $t_p$ | minimum duration of a silent period; |
| $t_r$ | relay time for transmission of an example of a pattern of tone pulses from a telephone to another telephone; |
| $t_s$ | safety margin between ending of transmission or reception of an example of a pattern of tone pulses at a telephone and starting of transmission or reception of the next successive example of a pattern of tone pulses at the same telephone. |

It will be understood that all reference numerals used herein are not intended to limit the scope of the claims.

What is claimed is:

1. A method of testing a voice path in a telecommunications system where said voice path includes voice compression and decompression, the method comprising the steps of:
   establishing a voice path including voice compression and decompression between a first telephone and a second telephone both involved in a call between at least two telephones;
   coding information uniquely identifying the first telephone into a pattern of tone pulses;
   repetitively transmitting examples of said pattern of tone pulses from the first telephone at a repeated transmission frequency via the established voice path; and
   monitoring the second telephone for reception of at least one of said examples of the pattern of tone pulses at the second telephone via the voice path established between the first and second telephones.

2. A method of testing a voice path in a telecommunications system according to claim 1, wherein the first telephone is cyclically selected from the plurality of telephones in the call such that the repeated transmission frequency, f, is given by:

$f=1/(N\Delta t)$, where N is the total number of telephones selected per cycle and $\Delta t$ is a predetermined time difference between selecting a telephone in the cycle to be the first telephone and selecting the next successive telephone in the cycle to be the first telephone.

3. A method of testing a voice path in a telecommunications system according to claim 2, wherein the predetermined time difference is 500 ms.

4. A method of testing a voice path in a telecommunications system according to claim 1, wherein at least one of said examples of the pattern of tone pulses received at the second telephone is read to identify the first telephone at the second telephone.

5. A method of testing a voice path in a telecommunications system according to claim 1, wherein, if the first telephone is put on hold, the repetitive transmitting step is interrupted.

6. A method of testing a voice path in a telecommunications system according to claim 1, wherein, if the second telephone is put on hold, the monitoring step is interrupted.

7. A method of testing a voice path in a telecommunications system according to claim 1, wherein the repetitive transmitting step is conducted for at least 23 hours.

8. A method of testing a voice path in a telecommunications system according to claim 1, wherein
   sinewave tone pulses are used to generate the pattern of tone pulses;
   linear predictive coding is used for voice compression; and
   the duration of the used sinewave tone pulses is longer than the code-window used for linear predictive coding.

9. A method of testing a voice path in a telecommunications system according to claim 1, using a pattern (401–417, 419–437) of pulses, wherein each pulse in the pattern has a duration equal to an integral multiple of 30 ms and each silent period between two successive pulses in the pattern has a duration equal to an integral multiple of 50 ms.

10. A method of testing a voice path in a telecommunications system where said voice path includes voice compression and decompression, the method comprising the steps of:
    establishing a voice path including voice compression and decompression between a first telephone and a second telephone both involved in a call between at least two telephones;
    coding information uniquely identifying the first telephone into a pattern of tone pulses;
    repetitively transmitting examples of said pattern of tone pulses from the first telephone at a repeated transmission frequency via the established voice path;
    monitoring the second telephone for reception of at least one of said examples of the pattern of tone pulses at the second telephone via the voice path established between the first and second telephones; and
    issuing a warning that the voice path between the first and second telephones is interrupted, if a first one of said examples of the pattern of tone pulses transmitted from the first telephone is not received at the second telephone during said monitoring step.

11. A method of testing a voice path in a telecommunications system according to claim 10, wherein:
    if a second one of said examples of the pattern of tone pulses transmitted from the first telephone is received at the second telephone during said monitoring step within a first predetermined time period starting from when said first example was not received at the second telephone, an indication is issued that the voice path between the first and second telephones is reestablished.

12. A method of testing a voice path in a telecommunications system according to claim 11, wherein:
    if no example of the pattern of tone pulses transmitted from the first telephone is received at the second telephone during said monitoring step within a second predetermined time period starting from when said first example was not received at the second telephone,
    an indication is issued that the second telephone has been disconnected from the first telephone.

13. A method of testing a voice path in a telecommunications system according to claim 11, wherein at least one of the first and the second predetermined time period is equal to 8/f, where f is said repeated transmission frequency.

14. A method of testing a voice path in a telecommunications system according to claim 10, wherein the first telephone is cyclically selected from the plurality of telephones in the call such that the repeated transmission frequency, f, is given by:

$$f=1/(N\Delta t),$$

where N is the total number of telephones selected per cycle and Δt is a predetermined time difference between selecting a telephone in the cycle to be the first telephone and selecting the next successive telephone in the cycle to be the first telephone.

15. A method of testing a voice path in a telecommunications system according to claim 14, wherein the predetermined time difference is 500 ms.

16. A method of testing a voice path in a telecommunications system according to claim 10, wherein at least one of said examples of the pattern of tone pulses received at the second telephone is read to identify the first telephone at the second telephone.

17. A method of testing a voice path in a telecommunications system according to claim 10, wherein, if the first telephone is put on hold, the repetitive transmitting step is interrupted.

18. A method of testing a voice path in a telecommunications system according to claim 10, wherein, if the second telephone is put on hold, the monitoring step is interrupted.

19. A method of testing a voice path in a telecommunications system according to claim 10, wherein the repetitive transmitting step is conducted for at least 23 hours.

20. A method of testing a voice path in a telecommunications system according to claim 10, wherein sinewave tone pulses are used to generate the pattern of tone pulses;

linear predictive coding is used for voice compression; and the duration of the used sinewave tone pulses is longer than the code-window used for linear predictive coding.

21. A method of testing a voice path in a telecommunications system according to claim 10, using a pattern (401–417, 419–437) of pulses, wherein each pulse in the pattern has a duration equal to an integral multiple of 30 ms and each silent period between two successive pulses in the pattern has a duration equal to an integral multiple of 50 ms.

22. A method of testing a voice path in a telecommunications system where said voice path includes voice compression and decompression, where the telecommunications system is a GSM system, the method comprising the steps of:

establishing a voice path including voice compression and decompression between a first telephone and a second telephone both involved in a call between at least two telephones, coding information uniquely identifying the first telephone into a pattern of tone pulses, repetitively transmitting examples of said pattern of tone pulses from the first telephone at a repeated transmission frequency, monitoring the second telephone for reception of at least one of said examples of the pattern of tone pulses at the second telephone via the voice path established between the first and second telephones, and wherein said pattern of tone pulses comprises:

i sinewave tone pulses, each having a respective duration, $d_i$, equal to an integral multiple of a first time interval, $t_d \geq 25$ ms, and j silent periods, each having a respective duration, $p_j$, equal to an integral multiple of a second time interval, $t_p \geq 50$ ms, where $i \geq 1$ and $j \geq 0$; $i, j \in$ {Integers}, such that the total duration, S, of said pattern of tone pulses given by:

$$S=S_id_i+S_jp_j$$

is such that:

$$S \leq 260 \text{ ms},$$

where $S_id_i$ is the sum of the durations of the sinewave tone pulses and $S_jp_j$ is the sum of the durations of the silent periods in the pattern of tone pulses.

23. A method of testing a voice path in a telecommunications system according to claim 22, wherein the first time interval, $t_d > 20$ ms.

24. A method of testing a voice path in a telecommunications system according to claim 22, wherein the first time interval, $t_d$, is 30 ms, the second time interval, $t_p$, is 50 ms, and the total duration, S, of said pattern of tone pulses is 250 ms.

25. A method of testing a voice path in a telecommunications system according to claim 22, wherein the frequency of the sine used to generate the tone pulses is below the upper limit of the bandwidth of the transmission channel.

26. A method of testing a voice path in a telecommunications system according to claim 22, wherein the frequency of the sine used to generate the tone pulses is between 300 Hz and 1.33 kHz.

27. A method of testing a voice path in a telecommunications system according to claim 22, wherein the first telephone is cyclically selected from the plurality of telephones in the call such that the repeated transmission frequency, f, is given by:

$$f=1/(N\Delta t),$$

where N is the total number of telephones selected per cycle and Δt is a predetermined time difference between selecting a telephone in the cycle to be the first telephone and selecting the next successive telephone in the cycle to be the first telephone.

28. A method of testing a voice path in a telecommunications system according to claim 27, wherein the predetermined time difference is 500 ms.

29. A method of testing a voice path in a telecommunications system according to claim 22, wherein at least one of said examples of the pattern of tone pulses received at the second telephone is read to identify the first telephone at the second telephone.

30. A method of testing a voice path in a telecommunications system according to claim 22, wherein, if the first telephone is put on hold, the repetitive transmitting step is interrupted.

31. A method of testing a voice path in a telecommunications system according to claim 22, wherein, if the second telephone is put on hold, the monitoring step is interrupted.

32. A method of testing a voice path in a telecommunications system according to claim 22, wherein the repetitive transmitting step is conducted for at least 23 hours.

33. A method of testing a voice path in a telecommunications system according to claim 22, wherein
sinewave tone pulses are used to generate the pattern of tone pulses;
linear predictive coding is used for voice compression; and
the duration of the used sinewave tone pulses is longer than the code-window used for linear predictive coding.

34. A method of testing a voice path in a telecommunications system according to claim 22, using a pattern (401–417, 419–437) of pulses, wherein each pulse in the pattern has a duration equal to an integral multiple of 30 ms and each silent period between two successive pulses in the pattern has a duration equal to an integral multiple of 50 ms.

35. An apparatus for testing a voice path in a telecommunications system where the voice path includes voice compression and decompression, comprising:

means for establishing a voice path between a first telephone and a second telephone both involved in a call between at lest two telephones;

tone pulse generating means for generating a pattern of tone pulses uniquely identifying the first telephone and repetitively transmitting examples of the pattern of tone pulses from the first telephone at a repeated transmission frequency via the established voice path; and monitoring means to monitor the second telephone for reception of at least one of said examples of the pattern of tone pulses at the second telephone via the voice path established between the first and second telephones.

* * * * *